United States Patent
Vanel et al.

(10) Patent No.: US 10,703,224 B2
(45) Date of Patent: Jul. 7, 2020

(54) CONVERTIBLE VEHICLE INTERIOR

(71) Applicant: FAURECIA INTERIEUR INDUSTRIE, Nanterre (FR)

(72) Inventors: Eric Vanel, Novilliers (FR); Fabrice Aycoberry, Saint Germain en Laye (FR); Thierry Devoulon, La Garenne Colombes (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 75 days.

(21) Appl. No.: 16/018,034

(22) Filed: Jun. 25, 2018

(65) Prior Publication Data
US 2019/0001841 A1    Jan. 3, 2019

(30) Foreign Application Priority Data

Jun. 29, 2017    (FR) ...................................... 17 56019

(51) Int. Cl.
| | |
|---|---|
| *B60N 2/01* | (2006.01) |
| *B60N 2/06* | (2006.01) |
| *B60N 2/14* | (2006.01) |
| *B60N 3/00* | (2006.01) |

(52) U.S. Cl.
CPC ................ *B60N 2/01* (2013.01); *B60N 2/062* (2013.01); *B60N 2/065* (2013.01); *B60N 2/14* (2013.01); *B60N 3/001* (2013.01)

(58) Field of Classification Search
CPC .......... B60N 2/01; B60N 2/062; B60N 2/065; B60N 2/14; B60N 3/001
See application file for complete search history.

(56) References Cited

U.S. PATENT DOCUMENTS

| | | | | |
|---|---|---|---|---|
| 7,264,291 B2 * | 9/2007 | Radu | ......................... | B60R 7/04 |
| | | | | 296/24.34 |
| 8,763,747 B2 * | 7/2014 | Jones | ....................... | B60N 2/14 |
| | | | | 180/329 |
| 9,597,983 B2 | 3/2017 | Strasdat et al. | | |

(Continued)

FOREIGN PATENT DOCUMENTS

| | | | | |
|---|---|---|---|---|
| DE | 102007062576 A1 * | 6/2009 | ............... | B60N 2/01 |
| DE | 102014214364 A1 | 2/2016 | | |

(Continued)

OTHER PUBLICATIONS

International Search Report for French application No. FR 1756019, dated Feb. 28, 2018, 2 pages.

*Primary Examiner* — Lori L Lyjak
(74) *Attorney, Agent, or Firm* — Reising Ethington P.C.

(57) ABSTRACT

A vehicle passenger compartment that defines a vehicle interior delimited in part by a floor, the interior having at least one front row of seats that includes at least two front seats, and at least one rear row of seats that includes at least two rear seats. The front and rear rows of seats are arranged behind one another in a longitudinal direction of the vehicle passenger compartment, each front seat being rotatable around a rotation axis substantially perpendicular to the floor. Each rear seat is translatable in a transverse direction substantially perpendicular to the longitudinal direction and to the rotation axis such that the rear seats can be moved away from or closer to one another in the transverse direction.

12 Claims, 1 Drawing Sheet

(56) References Cited

U.S. PATENT DOCUMENTS

| | | | |
|---|---|---|---|
| 9,604,588 B1* | 3/2017 | Rao | B60R 21/01534 |
| 10,252,693 B2* | 4/2019 | Numazawa | B60R 21/01554 |
| 2015/0137572 A1* | 5/2015 | Auger | B60N 2/062 |
| | | | 297/344.21 |
| 2015/0142246 A1* | 5/2015 | Cuddihy | B62D 1/183 |
| | | | 701/23 |
| 2017/0028987 A1* | 2/2017 | Yamada | B60W 50/08 |
| 2017/0050539 A1* | 2/2017 | Akimoto | B60N 2/0232 |
| 2017/0120776 A1* | 5/2017 | Slungare | B60N 2/14 |
| 2017/0217351 A1* | 8/2017 | Jaradi | B60N 3/008 |
| 2018/0186253 A1* | 7/2018 | Fitzpatrick | B60R 13/0243 |
| 2019/0208322 A1* | 7/2019 | Chapman | H04R 1/025 |
| 2019/0315259 A1* | 10/2019 | Lee | B60N 3/002 |

FOREIGN PATENT DOCUMENTS

| | | |
|---|---|---|
| DE | 102014224560 A1 | 6/2016 |
| WO | WO2015036973 A1 | 3/2015 |

\* cited by examiner

CONVERTIBLE VEHICLE INTERIOR

TECHNICAL FIELD

The present invention relates to a vehicle passenger compartment of the type defining a vehicle interior delimited in part by a floor, the passenger compartment further comprising at least one front row of seats, comprising at least two front seats, and at least one rear row of seats, comprising at least two rear seats, the front and rear rows of seats being arranged behind one another in a longitudinal direction of the vehicle passenger compartment on the floor, each front seat being rotatable around a rotation axis substantially perpendicular to the floor.

The invention also relates to a vehicle comprising such a vehicle passenger compartment.

BACKGROUND

In the context of so-called "autonomous" vehicles, in which driver intervention is reduced, or even practically nonexistent, to drive the vehicle, the arrangement of the passenger compartment may be configurable by modifying the orientation and/or the position of the seats, since they no longer necessarily need to face the road. It is thus for example possible to provide for turning the seats toward one another and/or placing the seats in elongated, more comfortable positions for the vehicle's passengers.

Such vehicles are generally configurable in a manual driving configuration, in which a driver can drive the vehicle using a steering wheel, and an automatic driving configuration, in which the driver does not intervene and therefore does not use the steering wheel.

In the so-called automatic driving configuration, it may be provided to improve the functionalities of the vehicle in order to distract the passengers of the vehicle, for example by providing a display device of the screen type, to display information on the driving of the vehicle, its geolocation, and/or to broadcast audiovisual content. To guarantee that the display is visible to everyone, one display device is generally provided for the passengers seated in the front seats and another display device for the passengers seated in the rear seats.

However, such an arrangement reduces the friendliness in the passenger compartment of the vehicle by isolating the passengers from one another.

SUMMARY

One aim of the invention is to propose a vehicle interior that is convertible to allow a friendly layout for the passengers of the vehicle.

To that end, the invention relates to a vehicle passenger compartment of the aforementioned type, wherein each rear seat is translatable in a transverse direction substantially perpendicular to the longitudinal direction and to the rotation axis such that the rear seats can be moved further from or closer to one another in said transverse direction.

By pivoting the front seats, it is possible to rotate the passengers seated on the seats toward one another and further to clear a space between the seats, in the location where the back rests of the front seat are typically located. By moving the rear seats so as to bring them closer together, it is then possible to position the passengers seated in the rear seats opposite the space cleared by the pivoted front seats. In this way, the passengers are brought closer to one another and a field of view shared by all of the passengers is cleared, which makes the interior friendlier. Furthermore, a shared display device can be placed in this shared field of view, which makes this display device visible to all of the passengers at the same time.

In various embodiments of the invention, the vehicle passenger compartment may include any of the following addition features, considered alone or according to any technically possible combination:
- the interior can be laid out between a first configuration, in which each front seat is substantially aligned with a rear seat in the longitudinal direction, and a second configuration, in which the front seats are turned around their rotation axis so as to move away from one another and in which the rear seats are translated so as to be brought closer to one another;
- the front seats and the rear seats are movable in a coordinated manner during the passage between the first and second configurations;
- the passenger compartment comprises a dashboard extending opposite the row of front seats in the longitudinal direction, said dashboard comprising at least one display device extending substantially in the transverse direction;
- the passenger compartment further comprises a support element arranged between the front seats, said support element defining an upper support surface;
- the support element is movable between a retracted position and an extended position, in which the support surface is greater than the support surface in the retracted position;
- the support surface increases in the transverse direction in the extended position;
- the passage from the retracted position to the extended position is done when the front seats are rotated around their rotation axis so as to be separated from one another; and
- the upper support surface of the support element extends between two lateral edges, said lateral edges remaining substantially parallel to the axis of the back rests of the front seats when the support element goes from the retracted position to the extended position and when the front seats are rotated around the rotation axis so as to be separated from one another.

The invention also relates to a vehicle comprising a vehicle interior as described above, said vehicle comprising a control device for automatic driving of the vehicle.

BRIEF DESCRIPTION OF THE DRAWINGS

Other aspects and advantages of the invention will appear upon reading the following description, provided as an example, and done in reference to the appended drawings, in which.

DETAILED DESCRIPTION OF THE ILLUSTRATED EMBODIMENTS

Figure 1:
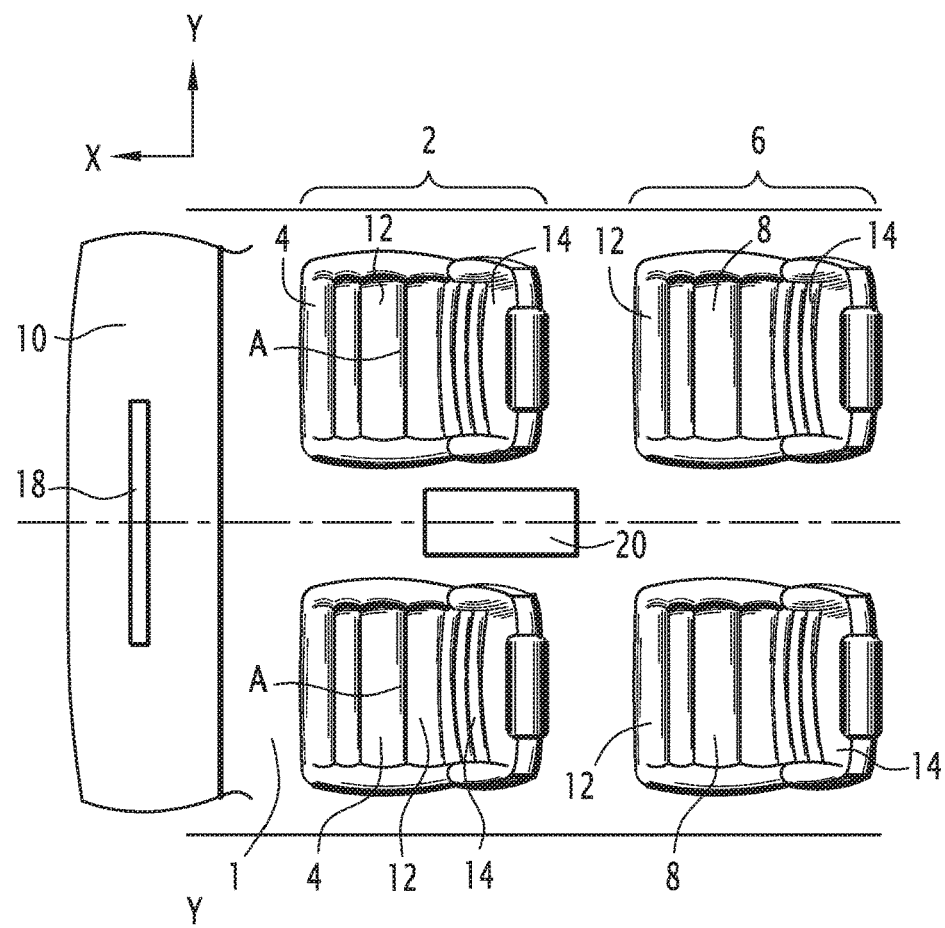
FIG. 1 is a schematic top view of a vehicle interior according to one embodiment of the invention, in a first configuration.

In reference to the figures, a vehicle is described comprising a vehicle body defining an interior arranged to receive several passengers of the vehicle. The vehicle is for example a motor vehicle. It is, however, understood that the invention applies to any type of vehicle.

The passenger compartment is partly defined by a floor 1 extending substantially and at least partly in a plane defined by a longitudinal direction X, corresponding to the front-back direction of the vehicle, and a transverse direction Y, corresponding to the width of the vehicle. The passenger compartment extends above the floor 1 in an elevation direction Z, corresponding to the height of the vehicle, and defines a vehicle interior in which the passengers of the vehicle are received.

The interior comprises a front row of seats 2, comprising at least two front seats 4, and a rear row of seats 6, comprising at least two rear seats 8. The terms "front" and "rear" are defined relative to the direction of travel of the vehicle when it is operating normally. Thus, the rear row of seats 6 extends behind the front row of seats 2 in the longitudinal direction X and the seats 4, 8 of a same row are arranged next to one another in the transverse direction Y. Traditionally, the interior for example further comprises a dashboard 10 extending in the transverse direction Y opposite the front row of seats 4 toward the front of the vehicle in the longitudinal direction X.

Each seat 4, 8 traditionally comprises a seat bottom 12, on which a passenger is intended to be seated, and a seat back 14, against which the passenger's back can rest. The position of each seat 4, 8 is adjustable so as to modify its position in the interior, for example to move it farther away from or closer to the dashboard 10 of the vehicle. To that end and as is known in itself, the seat bottom 12 of at least the front seats 4 is for example mounted translatably on rails secured to the floor of the vehicle and extending in the longitudinal direction X. Thus, each front seat 4 can be moved in the longitudinal direction by adjusting the position of the seat bottom 12 relative to the rails. Such an adjustment can also be provided for the rear seats 8. Also traditionally, the incline of the seat bottom 12 and/or the back rest 14 of each seat 4, 8 is adjustable. Thus, the angle between the seat bottom 12 and the longitudinal direction X and/or the angle between the back rest 14 and the elevation direction of the vehicle are adjustable so as to vary the incline of the seat as desired by the passenger. According to one embodiment, the incline of the seat bottom 12 and the back rest 14 can be adjusted independently of each other according to one operating mode and in a synchronized manner according to another operating mode. Thus, the user can adjust the incline of the seat bottom 12, the back rest 14, respectively, without altering that of the back rest 14, that of the seat bottom 12, respectively, according to one operating mode. According to another operating mode, the change of the incline of the seat bottom 12, the back rest 14, respectively, causes a corresponding change in the back rest 14, the seat bottom 12, respectively.

Each front seat 4 is further mounted pivoting relative to the floor 1 in order to make it possible to orient each front seat 4 relative to the other seats of the vehicle. Thus, each front seat 4 can for example face the other seats, during an autonomous, or automatic, driving phase of the vehicle, in which the driver does not intervene, and be turned toward the windshield in a manual driving phase. To that end, each front seat 4 is mounted rotating around a rotation axis A substantially perpendicular to the floor 1, i.e., extending the elevation direction. The rotation axis A for example passes substantially through the center of the seat bottom 12. Thus, the orientation of each front seat 4 is adjustable.

Figure 2:
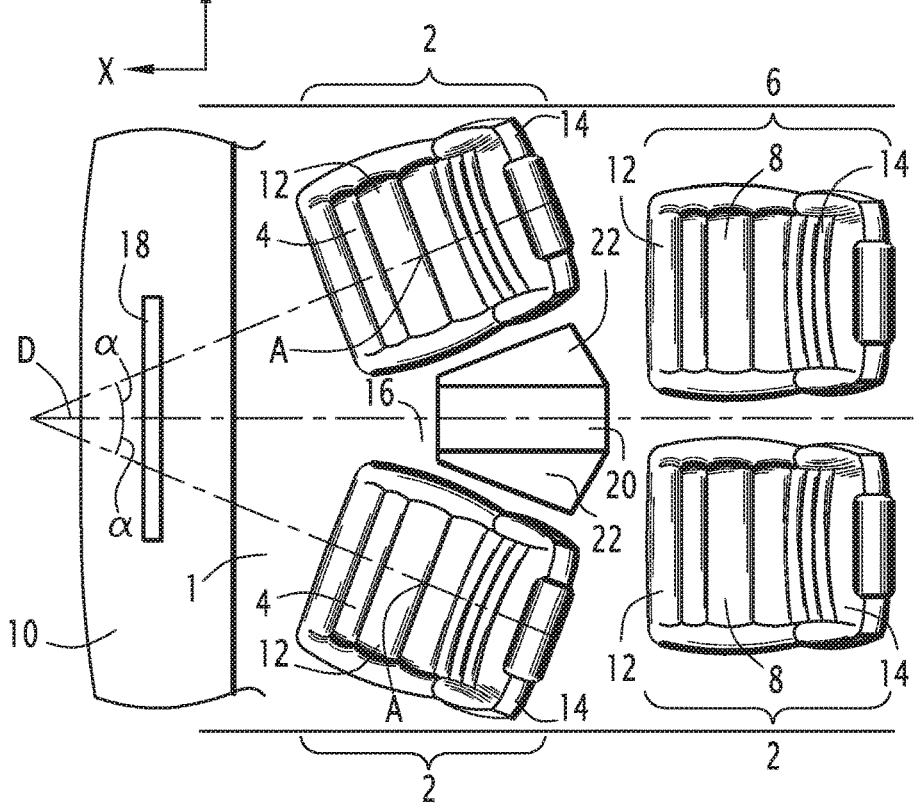
FIG. 2 is a schematic top view of the vehicle interior of FIG. 1, in a second configuration.

More particularly, in a first configuration of the interior, in which the seats face the windshield and the dashboard 10, the front seats 4 are substantially parallel to one another and their back rest extends substantially perpendicular to the longitudinal direction X, as shown in FIG. 1. Such a first configuration is for example a manual driving configuration, in which a driver is involved in the driving of the vehicle. In a second configuration of the interior, the front seats 4 face one another by pivoting each of them around their rotation axis A, as shown in FIG. 2. Such a second configuration is for example an automatic driving configuration, in which the vehicle is steered automatically, without involvement by a driver. The front seats 4 pivot in opposite directions to go to the second configuration so that the seat bottoms 12 of the seats 4 come closer to one another while the back rests 14 move away from one another. In the second configuration, an axis D perpendicular to the back rest for example forms an angle $\alpha$ with the longitudinal direction comprised between 10° and 45°, as shown in FIG. 2. Relative to the first configuration, the second configuration makes it possible to clear an enlarged space 16. This enlarged space 16 extends above the seat bottoms 12 between the separated back rests 14 of the front seats 4.

The rear seats 8 are further mounted translatably in the transverse direction Y so as to be able to move them further away or closer together in this direction. To that end, the seat bottom 12 of the rear seats 8 is for example mounted on rails extending on the floor 1 in the transverse direction Y. In the first configuration, the rear seats 8 are for example placed so as each to be aligned with a front seat 4 in the longitudinal direction, as shown in FIG. 1. Thus, in the first configuration, all of the passengers face the windshield and the field of view of the rear passengers toward the front of the vehicle is obstructed by the back rests 14 of the front seats 4. In the second configuration, the rear seats 8 are moved in the transverse direction so as to bring them closer to one another, as shown in FIG. 2. More particularly, the rear seats 8 are positioned so as to extend between the front seats 4 in the transverse direction, in particular opposite the enlarged space 16. Thus, in the second configuration, the field of view of the rear passengers toward the front of the vehicle is no longer obstructed by the back rests 14 of the front seats 4.

According to at least some embodiments of the invention, when the interior is in the second configuration, the passengers thus all share a shared field of view oriented in the longitudinal direction toward the center of the dashboard 10. Indeed, in this configuration, the field of view of the rear passengers extends in the longitudinal direction between the back rests 14 of the front seats 4, which are separated from one another, and the field of view of the front passengers extends in the direction of the axis D of the back rest 14 of the front seats 4, the axes D converging toward the center of the dashboard 10. Thus, in the second configuration, the friendliness of the vehicle interior is enhanced, the passengers being closer to one another and being turned more toward one another.

Passage from the first configuration to the second configuration may for example be done by a command of the vehicle triggered by the driver. The movements of the front 4 and rear 8 seats can be synchronized, i.e., the front 4 and rear 8 seats move in a coordinated manner, such that the rear seats 8 come closer to one another while the front seats 4 pivot to move away from one another.

According to another embodiment, the shared field of view of the passengers in the second configuration is used by placing a display device 18 on the dashboard 10. The display device 18 for example extends substantially in the transverse direction Y and is positioned substantially in the center of the dashboard 10 in this direction so as to extend opposite the enlarged space 16, as shown in FIG. 2. Thus, in the second configuration, all of the passengers can look at the same display device 18 without the view being obstructed by the front seats 4 for the passengers in the rear seats 8. The friendliness of the interior is thus improved.

The comfort of the vehicle interior can also be improved by arranging a support element 20 between the front seats 4 in the transverse direction. Such a support element 20 is for example formed by a vehicle center console and for example defines an upper support surface on which the front passengers can rest their elbows and/or place objects. The support element 20 is for example movable between a retracted position when the vehicle interior is in the first configuration (FIG. 1) and an extended configuration, when the vehicle interior is in the second configuration (FIG. 2). In the extended position, lateral parts 22 of the support element 20 deploy in order to increase the upper support surface relative to this surface in the retracted position. The pivoting of the front seats 4 in the second configuration in fact clears a space that makes it possible to increase the dimensions of the upper support surface, as shown in FIG. 2, so that the passengers in the rear seats 8 also have access to this support surface. The lateral parts 22 are for example arranged on either side of the console in the transverse direction Y and are each rotatable around a substantially longitudinal axis such that the increase in the support surface is done in the transverse direction Y corresponding to the direction in which the space is cleared when the front seats pivot in the second configuration. According to one embodiment, the support surface has a substantially polygonal shape, the lateral sides of which are substantially parallel to the axis D of the back rest 14 of the front seats 4, both in the first configuration and the second configuration, as shown in FIGS. 1 and 2. Thus, the edges of the lateral parts 22 are arranged to be parallel to the axis D when the lateral parts are deployed and the front seats 4 have pivoted into the second configuration.

The deployment of the support element 20 can also be coordinated with the movements of the front 4 and rear 8 seats such that the support element 20 enters its extended position when the front seats 4 pivot toward the second configuration.

According to one embodiment, the upper support surface of the support element 20 is also translatable in the longitudinal direction and/or in the elevation direction. Such a movement of the upper support surface makes it possible to adapt the position of the latter to the position of the front and rear passengers. Thus, in the second configuration, the upper support surface has an increased working surface so that the front passengers can rest their elbows on the upper support surface and the latter can be elevated so that the rear passengers can extend their legs below the upper support surface.

The vehicle interior described above therefore allows a convertible layout of the interior of the vehicle, the friendliness and comfort of which can be improved in the second configuration. Such a vehicle interior is particularly advantageous in a so-called "autonomous" vehicle, comprising a control device for automatic driving of the vehicle allowing the vehicle to be driven without involvement by a driver.

The invention claimed is:

1. A vehicle passenger compartment defining a vehicle interior delimited in part by a floor, the interior further comprising at least one front row of seats comprising at least two front seats, and at least one rear row of seats comprising at least two rear seats, the front and rear rows of seats being arranged behind one another in a longitudinal direction of the vehicle passenger compartment on the floor, each front seat being rotatable around a rotation axis substantially perpendicular to the floor, wherein each rear seat is translatable in a transverse direction substantially perpendicular to the longitudinal direction and to the rotation axis such that the rear seats can be moved away from or closer to one another in said transverse direction, wherein the seats are movable between a first configuration, in which the rear seats are aligned with the front seats in the longitudinal direction, and a second configuration, in which the rear seats are moved in the transverse direction so as to bring them closer to one another so as to extend between the front seats such that the passengers of the front and rear seats all share a shared field of view oriented in the longitudinal direction toward the center of the dashboard.

2. The vehicle passenger compartment according to claim 1, wherein the interior is configurable into a first configuration, in which each front seat is substantially aligned with a rear seat in the longitudinal direction, and into a second configuration, in which the front seats are turned around their rotation axis so as to move away from one another and in which the rear seats are translated so as to be brought closer to one another.

3. The vehicle passenger compartment according to claim 2, wherein the front seats and the rear seats are movable in a coordinated manner during the passage between the first and second configurations.

4. The vehicle passenger compartment according to claim 1, comprising a dashboard extending opposite the row of front seats in the longitudinal direction, said dashboard comprising at least one display device extending substantially in the transverse direction and in the shared field of view of said passengers.

5. The vehicle passenger compartment according to claim 1, further comprising a support element arranged between the front seats, said support element defining an upper support surface.

6. The vehicle passenger compartment according to claim 5, wherein the support element is movable between a retracted position and an extended position, in which the support surface is greater than the support surface in the retracted position.

7. The vehicle passenger compartment according to claim 6, wherein the support surface increases in the transverse direction in the extended position.

8. The vehicle passenger compartment according to claim 6, wherein the movement from the retracted position to the extended position is done when the front seats are rotated around their rotation axis so as to be separated from one another.

9. The vehicle passenger compartment according to claim 8, wherein the upper support surface of the support element extends between two lateral edges, said lateral edges remaining substantially parallel to an axis of back rests of the front seats when the support element goes from the retracted position to the extended position and when the front seats are rotated around the rotation axis so as to be separated from one another.

10. A vehicle comprising a vehicle passenger compartment according to claim 1, said vehicle comprising a control device for automatic driving of the vehicle.

11. A vehicle passenger compartment defining a vehicle interior delimited in part by a floor, the interior further comprising at least one front row of seats comprising at least two front seats, and at least one rear row of seats comprising at least two rear seats, the front and rear rows of seats being arranged behind one another in a longitudinal direction of the vehicle passenger compartment on the floor, each front seat being rotatable around a rotation axis substantially perpendicular to the floor, wherein each rear seat is translatable in a transverse direction substantially perpendicular to the longitudinal direction and to the rotation axis such that the rear seats can be moved away from or closer to one another in said transverse direction, the vehicle passenger compartment further comprising a support element arranged between the front seats, said support element defining an upper support surface, wherein the support element is movable between a retracted position and an extended position, in which the support surface is greater than the support surface in the retracted position, and wherein the support surface increases in the transverse direction in the extended position.

12. A vehicle passenger compartment defining a vehicle interior delimited in part by a floor, the interior further comprising at least one front row of seats comprising at least two front seats, and at least one rear row of seats comprising at least two rear seats, the front and rear rows of seats being arranged behind one another in a longitudinal direction of the vehicle passenger compartment on the floor, each front seat being rotatable around a rotation axis substantially perpendicular to the floor, wherein each rear seat is translatable in a transverse direction substantially perpendicular to the longitudinal direction and to the rotation axis such that the rear seats can be moved away from or closer to one another in said transverse direction, the vehicle passenger compartment further comprising a support element arranged between the front seats, said support element defining an upper support surface, wherein the support element is movable between a retracted position and an extended position, in which the support surface is greater than the support surface in the retracted position, and wherein the movement from the retracted position to the extended position is done when the front seats are rotated around their rotation axis so as to be separated from one another.

* * * * *